Dec. 12, 1939.  R. A. HEISING  2,183,399
ULTRA-SHORT WAVE ALTIMETER FOR AIRCRAFT
Filed May 15, 1937    4 Sheets-Sheet 1

INVENTOR
R. A. HEISING
BY *A. J. Zerbarini*
ATTORNEY

Dec. 12, 1939. R. A. HEISING 2,183,399
ULTRA-SHORT WAVE ALTIMETER FOR AIRCRAFT
Filed May 15, 1937 4 Sheets-Sheet 2

INVENTOR
R. A. HEISING
BY
*A. J. Zerbarini*
ATTORNEY

Patented Dec. 12, 1939

2,183,399

UNITED STATES PATENT OFFICE 2,183,399

ULTRA-SHORT WAVE ALTIMETER FOR AIRCRAFT

Raymond A. Heising, Summit, N. J., assignor to Bell Telephone Laboratories, Incorporated, New York, N. Y., a corporation of New York Application May 15, 1937, Serial No. 142,809

16 Claims. (Cl. 250—1)

This invention relates to the art of measuring distance by means of energy waves.

This invention contemplates the use of ultra-short electromagnetic waves in the measurement of altitudes up to approximately 300 feet. It is important, of course, to be able to accurately determine altitudes of this magnitude in landing and in taking off from landing fields. For this purpose it is suggested that ultra-short waves be transmitted from antennae, mounted at the end of one wing of an aircraft, over a lateral arc such that when the aircraft is at any height within approximately 300 feet of the ground some of the waves will strike the ground under the center of the aircraft and will be reflected from that point to receiving antennae, mounted on the end of the other wing.

Direct transmission from the transmitting to the receiving apparatus must be reduced to such an amount that it will not interfere with the reception of waves reflected from the ground. Any of the well-known methods of accomplishing the elimination of interference between the transmitting and receiving apparatus may be employed such as electrostatic and electromagnetic shielding, the use of antennae with suitable directive characteristics, alternate enabling and disabling of the sending and receiving apparatus, neutralization of energy, etc. Transmission at angles not included within the above-mentioned arc and not excluded by the necessity of reducing direct transmission to the receiving apparatus, need be limited only by considerations arising from the desirability of avoiding interference with other radio apparatus in the vicinity.

The angle at which reflected waves approach the receiving antennae, may be determined by the well-known method of comparing the phases of two components received by antennae a known distance apart. Where antennae are supported on the under-side of metal parts of the aircraft the latter will partially shield the antennae and may modify their directional characteristics. The angle, at which the waves reflected from the ground approach the craft, suffices as an index of the altitude when the aircraft is substantially parallel to the reflecting surface, since the distance between the transmitting and receiving antennae is known and the angle of incidence of the wave to the ground may be assumed to equal the angle of reflection therefrom. Alternatively, any particular system of this invention may, obviously, be calibrated empirically by observing the phase relation between the two components received for a succession of known distances or altitudes over the range of interest. In general the phase difference between the two components is a directly related function of the altitude or distance with respect to the reflecting surface. Having once calibrated the system, by whatever method is deemed most convenient, the phase meter, indicating the above-mentioned phase relation, may be calibrated to read altitude directly in feet, or other convenient units. The necessity of pointing or adjusting directive antennae, either transmitting or receiving, for maximum signal reception, or mechanically moving any bulking element of the system or the necessity of calculations by the pilot to convert the reading obtained into other units than those read directly are completely eliminated by the arrangements suggested in this invention.

When the altitude of the aircraft becomes greater than approximately three times its wing spread the change in the relative phase of the two received components with altitude becomes too small to give accurate indications of altitude. Assuming a wing spread of approximately 100 feet, the accuracy of the above-described method becomes insufficient at altitudes exceeding 300 feet.

For determining higher altitudes, this invention proposes that the ultra-short waves employed, as described above, be partially modulated by waves having a wave-length of approximately eight times the normal cruising height, or the height at which maximum accuracy and sensitivity is desired.

As will appear from the detailed description hereinafter, the long waves will not affect the operation of the low altitude indicating system mentioned above. They can be separated from the reflected component, received on one of the receiving antennae, for phase comparison with energy obtained directly from the long wave modulator on the aircraft. The difference in phase noted will be an index of the height of the aircraft. For such a system approximately 30 per cent modulation is suitable, and a frequency of 60 kilocycles, by way of example, will provide a wave of convenient length where maximum accuracy at an altitude of 2000 feet is desired.

A long wave of the same frequency could be employed alone for this purpose in the same manner. However, the use of such long waves is objectionable in that they usually cause much more interference with radio equipment at other stations. Furthermore the long wave lengths convenient for this use lie in a frequency range which has been assigned for other uses.

Even if such frequencies were assigned solely for aircraft altimeter use, the number of aircraft which could employ such systems within a given area without seriously interfering with each other would be much smaller than the number which could employ the equivalent system of partially modulated ultra-short waves suggested in this invention, without mutual interference.

By employing modulated ultra-short waves interference with other radio equipment may be largely eliminated and frequency ranges not at present utilized to any considerable extent may be employed. Ultra-short waves have numerous other advantages for use in the altimeter system of this invention not the least of which is that they permit advantageous positioning of the antennae within the restricted areas available on aircraft for such purpose. Wave-lengths within the range of one-quarter to five meters appear most desirable for the uses proposed in this invention, the particular wave-length employed in a given system being chosen upon the basis of adaptability to the size of the aircraft, the convenient spacing of the antennae, the wave-lengths employed by other stations in the area in which the craft is to be used and such similar considerations.

Antennae of the well-known doublet type also lend themselves to advantageous use with the system of this invention and as will hereinafter appear may be arranged so as to suppress direct transmission between the transmitting and receiving antennae on the aircraft.

An object of the invention is to provide automatic means whereby a continuous visual indication of the height of an aircraft is given with acceptable accuracy over a range of altitudes varying from a few feet to several thousand feet.

Another object of the invention is to provide a radio altimeter system which employs signals of such wave-lengths that they will not interfere with the commonly existing radio facilities.

Another object is to provide a radio altimeter system which combines advantages obtained by the use of longer waves with advantages inherent in systems employing ultra-short waves.

Other objects of the invention will become apparent in the course of the description given hereinafter and in the appended claims.

Figure 1:
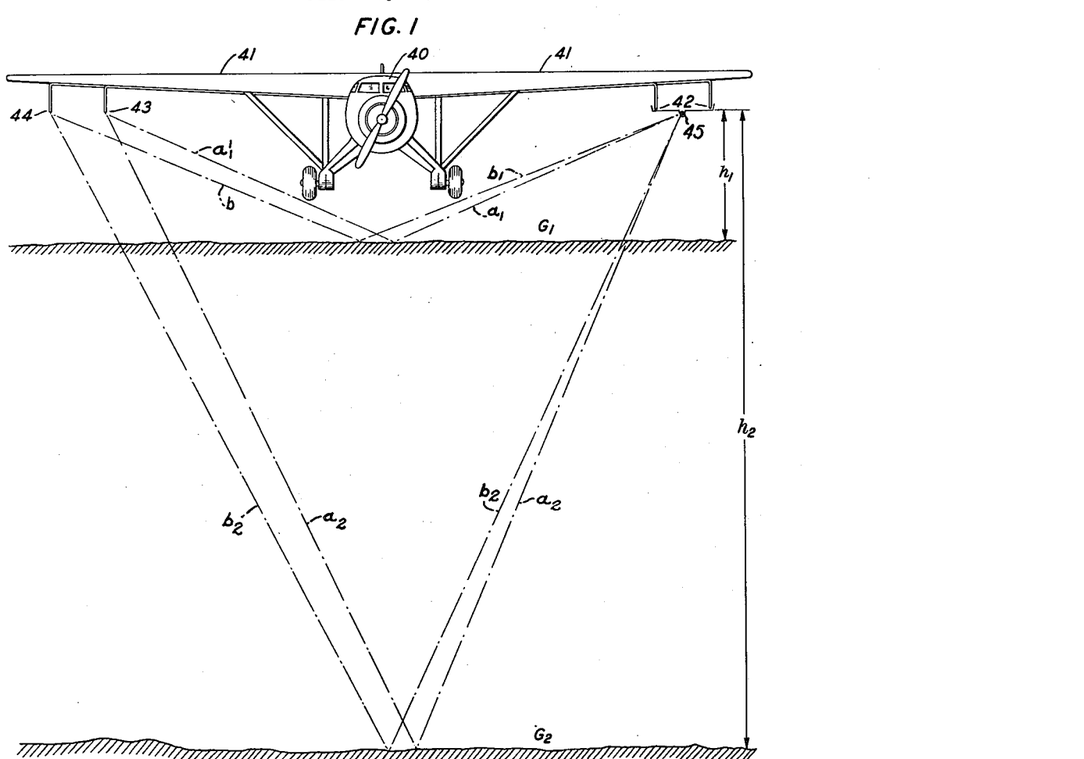
Fig. 1 is illustrative of the general mode of operation at low altitudes of a system of this invention.
Figure 5A:
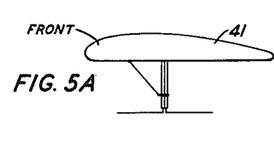
Fig. 5A shows an end view of an aircraft wing with a doublet antenna mounted thereon, the antenna elements being parallel with both the fuselage of the aircraft and the under surface of the wing.
Figure 5B:
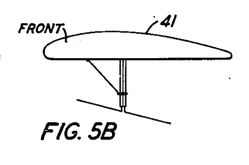
Fig. 5B is identical with Fig. 5A except that the antenna elements are inclined with respect to the under surface of the wing to radiate a substantial amount of energy in advance of, as well as directly downward from, the aircraft.

In Fig. 1 a diagrammatic representation of an aircraft 40, having wings 41 is shown. Transmitting antennae 42, and receiving antennae 43 and 44, are shown mounted under the wings of the craft at the right and left of the figure, respectively. The form of antennae commonly known as doublet antennae contemplated in this embodiment of the invention for both transmitting and receiving is indicated in Fig. 5A. As shown in Fig. 1 two transmitting antennae and two receiving antennae are employed. As will be described in more detail in connection with Fig. 14, the antennae may, if desired, be tilted as indicated in Fig. 5B. In both of these figures, 41 represents an end view of the wing.

Both the transmitting and receiving antennae should preferably be mounted as near the tips of their respective wings as practicable since indications of the height of the craft for landing operations are in effect determined ultimately by triangulation and the accuracy of the determinations at the higher altitudes is obviously increased in proportion to the separation between the transmitting and receiving points.

While the transmitting and receiving antennae may be symmetrically disposed with respect to the center of the aircraft as shown in Fig. 1, this also obviously is not essential, it being necessary merely to know what is the actual separation between the transmitting and receiving points.

If the wings are non-metallic the location of the antennae with respect thereto is immaterial. The effects of metallic wings upon the system are described in detail hereunder.

As will also be explained in detail hereunder, the transmitting antennae are arranged to transmit no energy along their common horizontal axis. To avoid the direct reception of energy from the transmitting antennae which might interfere with the reception of energy reflected from the ground, the receiving antennae should obviously be located approximately on the said horizontal axis of the transmitting antennae. By way of illustration in Fig. 1 the approximate paths of the utilized components of the waves of the altimeter system $a_1$, $b_1$, $a_2$, $b_2$, are indicated for two heights $h_1$ and $h_2$ respectively; $G_1$ and $G_2$, respectively, representing the ground. As described above the receiving and transmitting antennae may be of the doublet type shown in Fig. 5a though other types having similar characteristics may, of course, be employed.

Figure 2:
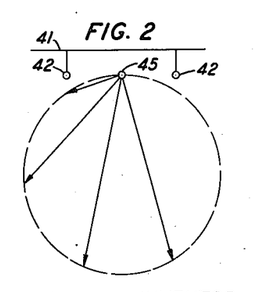
Fig. 2 shows a suitable directional characteristic for the transmitting antennae of Fig. 1.

The transmitting doublets 42 of Fig. 1 are spaced one-half of a wave-length apart and are energized in equiphase by a common energy source. They have, consequently toward the earth, approximately (in a vertical plane at right angles to the fuselage) the directional transmitting characteristics shown in Fig. 2. The combined effect of the pair of doublets is the equivalent of a single hypothetical antenna 45 (as indicated in both Figs. 1 and 2, said hypothetical antenna 45 having an equivalent directional characteristic to that of the two actual antennae 42 acting together and being located midway between the antennae 42. This phenomena is explained in an article entitled "Certain Factors Affecting the Gain of Directive Antennas" by G. C. Southworth published in the Bell System Technical Journal, volume 10 of January 1931, pages 63 to 95, inclusive, and is illustrated in Fig. 1 on page 65 of the article. In Fig. 2 of the drawings accompanying this application, the upper half of the transmitting characteristic is not shown since the present invention employs essentially only the energy transmitted toward the earth. he entire characteristic should, however, be considered in case the aircraft wing on which the antennae are mounted is constructed of metal, for, as is well known to the art, reflections will then occur which may cause trouble either by interfering with the directly transmitted energy or by destroying the discrimination against direct transmission between the transmitting and receiving antennae. As is well known to the art also, interference difficulties may be largely eliminated by spacing the antennae one-half wave-length below the metallic surface in which case the larger part of the resurface in which case the larger part of the reflected energy will arrive back in phase with and reinforcing the energy transmitted toward the ground. The transmission of energy to the receiving antennae by reflection from the metallic surface of the wing should not exceed that passing directly from the transmitting to the receiving antennae since the directional characteristic of the transmitting antennae towards the wing is precisely the same as towards the ground, very little energy being transmitted at such an angle as to be reflected from the wing towards the receiving antennae. In cases where the aircraft wing is of metal, interference with radio apparatus in other craft above the transmitting craft will obviously be reduced by the well-known shielding effect of such a metallic wing. Likewise, the metal wing above the receiving antennae will act as a shield against energy transmission from higher aircraft or energy which might possibly be reflected from atmospheric strata above the craft.

The directional transmitting characteristic of the pair of doublets 42 arranged as shown in Fig. 1 includes appreciable components projecting ahead of the plane by an angle of approximately 30 degrees, which is obviously advantageous since it will provide a warning of rising ground or obstructions ahead. This matter will be discussed at more length in connection with Fig. 14.

It should be noted that with the doublets 42 spaced one-half wave-length apart the transmitting antennae discriminate against transmission in their common plane, that is, against direct transmission to receiving antennae 43 and 44.

Figure 3:
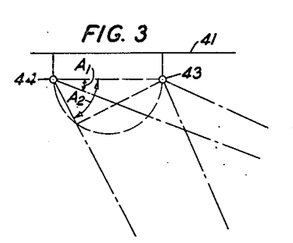
Fig. 3 illustrates the variation in relative phase with height of two components of the reflected signals reaching the receiving antennae of Fig. 1.
Figure 4:
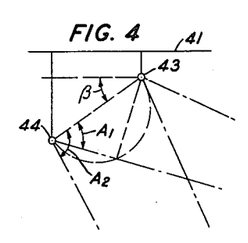
Fig. 4 illustrates how the sensitivity at small altitudes may be increased by changing the relative positions of the receiving antennae of Fig. 1.

Considering Fig. 1, the relative phase of the components of the reflected signal received by the antennae 43 and 44 is a function of the angle at which the components approach these antennae. Since this angle in turn is a function of the distance or altitude of the craft with respect to the reflecting surface it follows that the relative phase of the two received components is a directly related index of the said distance or altitude and a relative phase indicating device actuated by the said two components may be calibrated directly in feet or other convenient units. This is illustrated in Fig. 3, cosines of angles A1 and A2 corresponding to different phase relations resulting from different angles of approach. An increase in the rate of change of the cosine of the angle and hence in accuracy near the ground may be obtained by placing the outer receiving antennae 44 below the inner one 43 with respect to the wing of the plane, as indicated in Fig. 4. This must be balanced against a corresponding sacrifice of accuracy at higher altitudes. It is usually convenient to space these antennae one-half wave-length apart as such spacing furnishes still further discrimination against direct transmission from the transmitting antennae. However as demonstrated in U. S. Patent 961,265 issued June 14, 1910, to J. S. Stone, practically any desired spacing may be employed.

The angles at which reflected waves approach antennae 43 and 44 are, of course, determined by the distance of the aircraft from the reflecting surface and the distance between the effective transmitting point and the outside receiving antenna 44, so that the relative phase of the reflected signal components is a direct function of altitude, the altitude, being determinable by simple triangulation, assuming the aircraft to be flying with its wings parallel to the ground surface. A relative phase indicating device may, therefore, be calibrated as hereinbefore mentioned for any particular system of this invention either by calculation or by observation of relative phase readings obtained for a succession of known distances or altitudes with respect to the reflecting surface, over the range of interest, to read altitude directly.

The accuracy of the readings obtained is, of course, decreased if the wings of the aircraft are not parallel to the surface of the ground. However, in landing and in taking off, the wings of the craft are usually substantially parallel to the landing field. It would obviously be possible to arrange switching means for transmitting alternately from the antennae on the right and left wings of the craft and receiving alternately from the antennae not being employed for transmission. A steady reading of the altitude-indicating, phase-comparison meter would, under such circumstances, indicate that the wings of the craft were parallel with the ground surface and that the altitude reading was correct. If the craft were not parallel with the ground surface the variation between successive readings would indicate the angle of inclination of the craft with respect to the ground surface.

Figs. 5A and 5B show the method of mounting the doublet antennae. The radiating members are merely extensions of the inner conductors of coaxial conductor pairs. The outer conductors or tubes of these coaxial pairs are employed to provide mechanical support as well as electrical shielding. A brace between the outer tubes and the wing of the aircraft as indicated may be used to afford greater mechanical rigidity. The doublets are, as indicated, mounted parallel to the fuselage.

Figure 6:
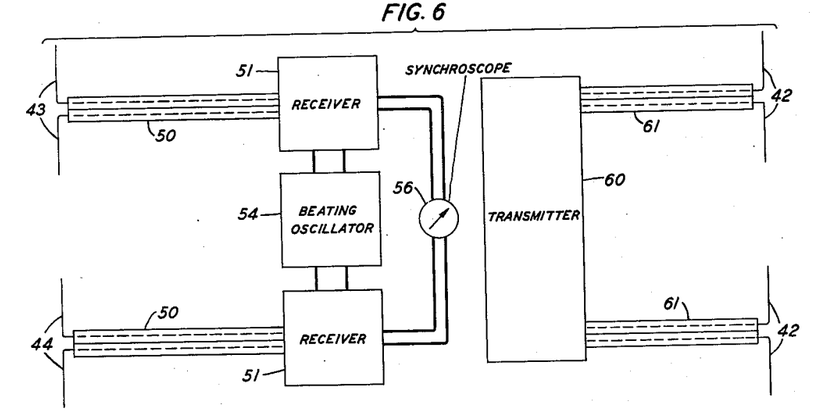
Fig. 6 shows in diagrammatic form the electrical circuit of the low altitude altimeter system.

Fig. 6 shows in diagrammatic form the general features of an altitude measuring system of this invention suitable for measuring altitudes up to approximately three times the separation between the transmitting and receiving points of the system the general arrangement of antennae on the aircraft employing the altimeter system being essentially as described in connection with Fig. 1. The system comprises an ultra-short wave transmitter 60 connected by suitable transmission lines 61 to the transmitting doublet antennae 42; receiving doublet antennae 43 and 44, each of which is connected by a suitable transmission line 50 to a receiver 51; a "beating oscillator" 54 providing receivers 51 with oscillations of a suitable frequency so that a convenient beat frequency may be produced in the receivers and the phase of the receiver outputs may be conveniently compared by the synchroscope 56. The scale of the synchroscope may, as described in connection with Fig. 1 above, be calibrated to show the altitude directly. With the exception of one type of synchroscope and a number of methods of obtaining suitable "beating oscillator" frequencies which will be described in detail hereinafter, the apparatus of the system may take any of the well-known forms usually employed in ultra-short wave radio systems.

With aircraft having a wing spread of 100 feet the system of Fig. 6 provides acceptably accurate altitude readings up to about 300 feet. Above this altitude the angular changes become small.

While an independent beating oscillator 54 may be used as indicated in Fig. 6, the stability of both the beating oscillator and the transmitter would have to be of a high order if a steady beat note of 1000 cycles or less is to be obtained. Since the commercially available synchroscopes are usually designed to operate at frequencies less than 1000 cycles and the accuracy of synchroscopes of the prior art at higher frequencies is open to question, it may be, as a practical matter, advantageous to obtain a low frequency beat note.

Figure 7:
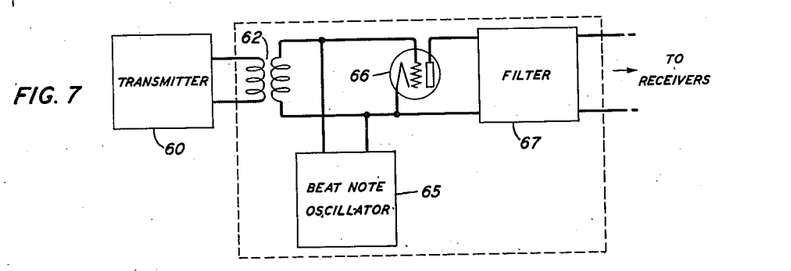
Fig. 7 shows the arrangement of apparatus employed in one method of obtaining a suitable beating oscillator frequency for use with this invention.

One scheme for overcoming the necessity for extreme frequency stability is illustrated in Fig. 7 where the beat note desired, say $\Delta f$, is generated by an oscillator 65, and is caused to modulate energy of the ultra-short wave of frequency $f$ obtained from the transmitter 60 through transformer 62, in a modulator 66. Filter 67 selects one side-band, for example $f-\Delta f$ of the modulator output which may then be employed as the beating frequency for the receivers 51 of Fig. 6. The beat note obtained will, of course, always be that generated by oscillator 65, since the beating frequency will drift in exactly the same way as the ultra-short wave frequency of the transmitter. It will be understood that the transmitter 60 is also associated with antennae 42 through transmission lines 61 in the same manner as in Fig. 6.

Figure 8:
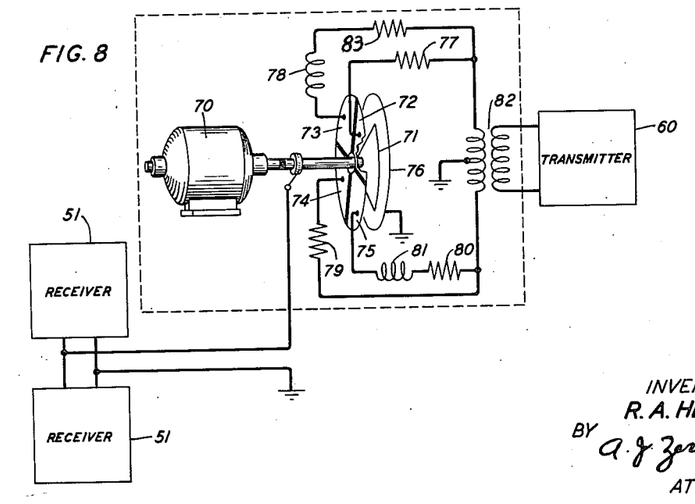
Fig. 8 shows in diagrammatic form the arrangement of apparatus and the circuit employed in an alternate method of obtaining a suitable beating oscillator frequency for use with this invention.

An alternative scheme to provide a suitable beating frequency for receivers 51 is shown in Fig. 8 where sector plate 71 is arranged to be rotated at a uniform speed between the plates 72 to 75, inclusive, and the common grounded plate 76. The capacities between plates 72 to 75, inclusive, and plate 76 are as shown energized through transformer 82 by energy from transmitter 60. By splitting the phase of the supply in a well-known manner, through the use of resistances 83, 77, 79 and 80 and coils 78 and 81, the electrostatic field between these plates may be effectively caused to rotate so that if plate 71 were left stationary the frequency obtained would be that of the transmitter. If, however, plate 71 be rotated uniformly in the rotating electrostatic field, the effect is to increase or decrease the frequency obtained on plate 71 by the number of cycles corresponding to the revolutions per second of plate 71. Obviously, if the plate rotates in the same direction as the field the frequency will be decreased and if in the opposite direction, the frequency will be increased. In either case, the frequency obtained may be used as a beating frequency in receivers 51 and the frequency of the beat note obtained is determined solely by the speed at which plate 71 is rotated. The principles underlying the operation of this device are explained in detail in U. S. Patent 2,004,613 issued on June 11, 1935, to L. A. Meacham.

Figure 9:
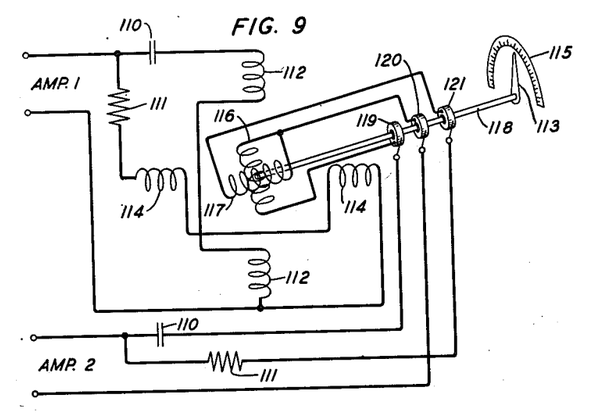
Fig. 9 shows a moving coil type of synchroscope which may be employed with this invention.

Fig. 9 shows one well-known form of synchroscope or relative phase indicator which may be employed to show the phase relation between the outputs of receivers 51 of Fig. 6. It consists of stator coils 112 and 114 fixed relatively at right angles about rotor coils 116 and 117, the latter being also fixed relatively at right angles on shaft 118, the shaft 118 being free to turn, and being perpendicular to the plane of the paper which in turn is the plane containing axes of coils 112, 114, 116 and 117.

By applying the outputs of receivers 51 of Fig. 6, one to the stator coils and the other to the rotor coils after splitting their phase as indicated in Fig. 9 by the use of resistances 111 and condensers 110 each set of coils will establish rotating electromagnetic fields, and the two will come into step or in synchronism by rotation of shaft 118 to compensate for any phase difference between them. The amount of rotation of shaft 118 is therefore a direct measure of the relative-phase relation between the two. Shaft 118 carries pointer 113 which travels along scale 115 as shaft 118 turns. For this system, as explained above, scale 115 may be calibrated directly in feet.

Figure 10:
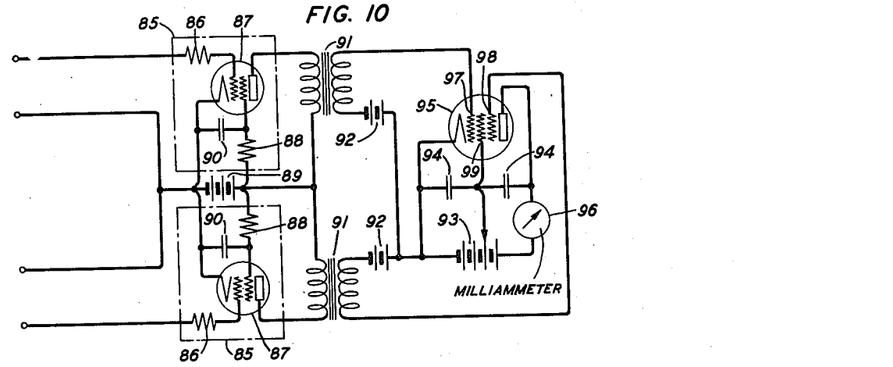
Fig. 10 shows an alternative type of synchroscope or relative-phase indicator based upon the use of electronic devices.
Figure 11:
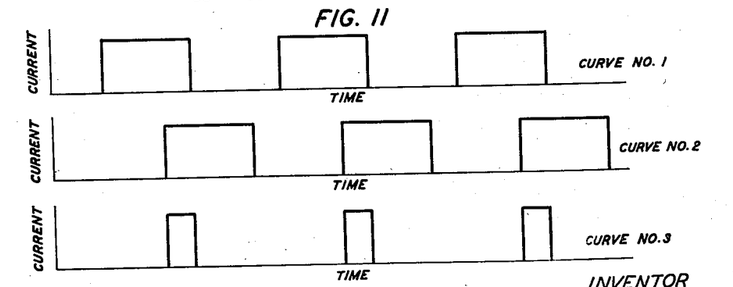
Fig. 11 is illustrative of the operation of the device of Fig. 10.

An alternate device to furnish an indication of the relative phase of the two receiver outputs is indicated in Fig. 10. The method of relative phase determination and the combination of apparatus employed therefor, are claimed in my continuing application, Serial No. 295,220, filed September 16, 1939. This device comprises two vacuum tube limiters 85, one suitable form well known to the art being shown, comprising a four-element vacuum tube 87, resistances 86 and 88 and condenser 90. Battery 89 supplies both limiter tubes. These limiters convert the two signals into successions of square-topped impulses substantially as illustrated in Fig. 11, curves No. 1 and No. 2, respectively. These impulses are applied to the control grids of the pentode vacuum tube 95 through transformers 91. The control circuits of pentode 95 are so arranged that the plate current will increase only when both control grids 97 and 98 are positive, that is, during the intervals over which the square-topped impulses of curves No. 1 and No. 2 of Fig. 11 are coexistent. The plate current of the pentode 95 will then consist of a series of impulses as indicated by curve 3 of Fig. 11 and the current flowing through a milliammeter 96 in the plate circuit of the pentode will be a straight line function of the phase displacement between the impulses No. 1 and No. 2 of Fig. 11. The arrangement of Fig. 10 may, therefore, be employed as a synchroscope. The operation of the device being principally dependent upon electronic means, it will operate with facility at radio frequencies and in the system of this invention permits the use of a beating oscillator frequency far enough removed from that of the ultra-short wave transmitted, so that the problem of precise frequency control becomes much less severe.

Figure 12:
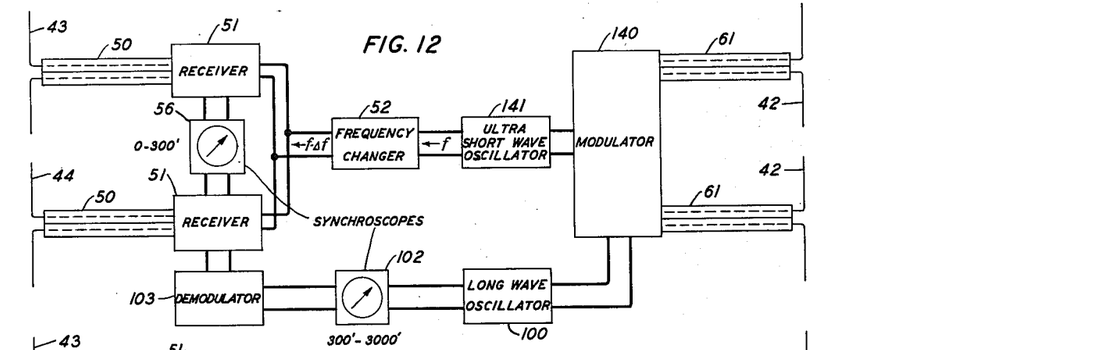
Fig. 12 shows a system of this invention providing both low altitude and high altitude altimeter indicators.

Fig. 12 shows the system of Fig. 6 rearranged and with apparatus added to give accurate altitude indications at cruising altitudes. The rearranged and additional apparatus comprises the following: A long wave oscillator 100, an ultra-short wave oscillator 141 and a modulator 140 by which the ultra-short waves emitted may be modulated by a suitable long wave to about 30 per cent, a demodulator 103 which demodulates the reflected wave received on one of the receiving antennae 44 to reproduce the long modulating wave and a synchroscope 102 which is supplied with some of the long wave energy directly from oscillator 100 and with the long wave modulating component of the reflected wave obtained from demodulator 103. The phase difference between the reflected and the local modulating energies is of course an index of the altitude of the aircraft. Synchroscope 102 may conveniently be of the type shown in Fig. 10.

For convenient use with a synchroscope of the type of Fig. 10 the long wave modulating frequency should be so chosen that the normal cruising altitude is about an eighth of the wave-length. For example, for a normal cruising altitude of 2000 feet, a modulating frequency of 60 kilocycles will give a reflected wave 90 degrees out of phase with the local source and referring to Fig. 11 it is evident that a synchroscope of the type of Fig. 10 will be operating about mid-scale position for such a condition and will conveniently indicate a considerable change of altitude without encountering phase differences so small that the small absolute error inherent in any such system will be of significant magnitude. The modulation of the ultra-short waves will not interfere with the operation of the low altitude indicating apparatus since the long wave modulations will not affect the low frequency device of Fig. 9 or will be wiped off by the squaring effect which is produced on the tops of the individual half waves by the limiters of the device of Fig. 10 if the latter device is being employed in the low altitude indicating system. The device 52 supplies a suitable beating frequency to the receivers for the low altitude indications and may be of the type shown in Fig. 7 or of that shown in Fig. 8.

Figure 13:
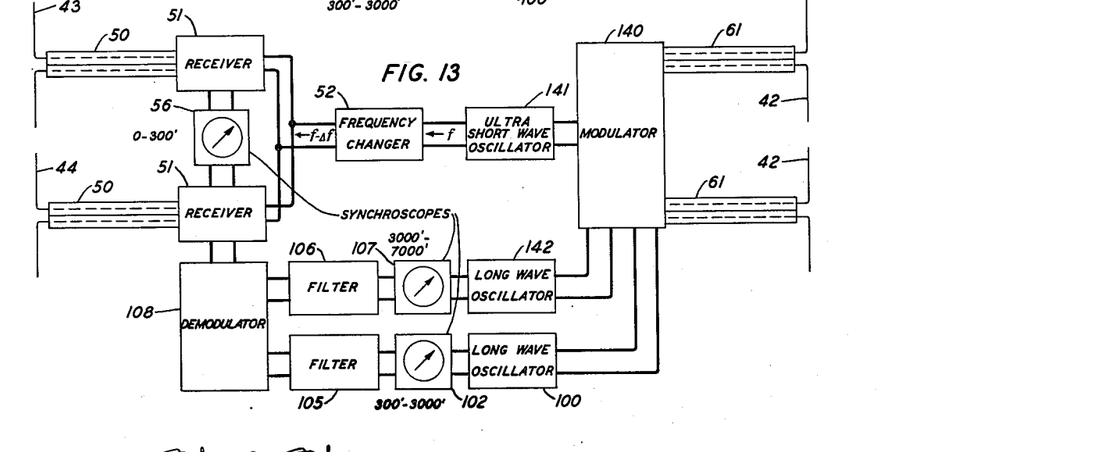
Fig. 13 shows a system of this invention providing one low altitude and two high altitude altimeter indicators.

If accurate altitude indications in the vicinity of several widely separated cruising altitudes are desired the ultra-short waves may be partially modulated by a corresponding number of longer waves, the length of each modulating wave being chosen so that it will afford accurate indications at one of the selected altitudes. The several modulating waves may be separated by suitable filters after having been received and demodulated, and each supplied to an appropriate synchroscope where its phase may be compared with that of energy of like frequency derived from the appropriate local oscillator. Fig. 13 shows the modifications of the system of Fig. 12 necessary to permit partial modulation of the ultra-short wave by two long wave frequencies so that accurate altitude determinations may be obtained over an extended range of cruising altitudes. Filter 105 passes the modulating frequency used in obtaining altitude indications within the range of 300 feet to 3000 feet and filter 106 passes the modulating frequency employed for the range extending from 3000 feet to 7000 feet. Long wave oscillator 142 supplies the appropriate modulating frequency for this latter range. Synchroscope 107 may, of course, be similar to synchroscope 102 except that it should be calibrated for the higher range of altitudes. A single synchroscope having a suitable plurality of scales could of course be employed with switching facilities to connect it into the several circuits as desired. Obviously, too, a single long wave oscillator could be arranged so that its frequency could be changed from that suitable for one range of altitude to that suitable for another range, the associated synchroscope being provided with an appropriate scale for each range.

As mentioned above, a particular advantage of employing modulated ultra-short waves of the character suggested is that they produce less interference with other radio apparatus.

While the system of altitude determination at cruising altitudes as described depends upon a simple phase comparison of the modulating component of the reflected ultra-short wave with energy derived from the local modulator, it is obvious that any of the well-known methods of determining altitude by the use of unmodulated waves, such for example as those described in U. S. Patents 2,045,071 and 2,045,072, both issued on June 23, 1936, to L. Espenschied, may equally well be employed by modifying the system to employ ultra-short waves of constant frequency modulated by other waves having the requisite character to furnish altitude indications in accordance with such other methods.

Figure 14:
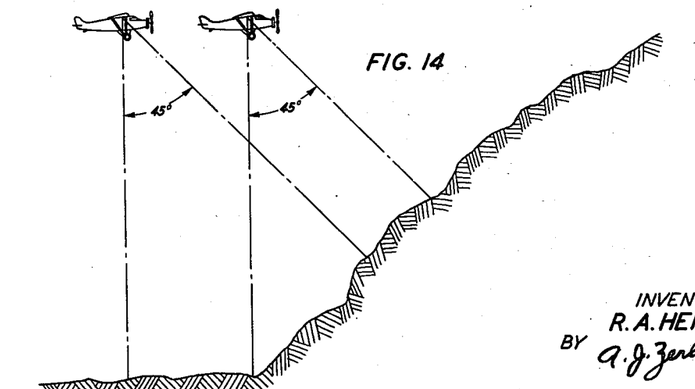
Fig. 14 is illustrative of the operation of the altimeter system of this invention upon approaching rising ground.

Fig. 14 illustrates how the altimeter systems of this invention provide a warning of an approach to rising ground since the waves are radiated ahead in appreciable amounts at all angles except zero angle with the plane of the doublets and will operate effectively to provide reflections from an approaching hill having a slope, as indicated, averaging 45 degrees. This character may obviously be accentuated in cases where this feature is considered important by tilting the antennae doublets as shown in Fig. 5b so that they will readily transmit and receive at a greater angle in advance of the aircraft. In some instances it may even be desirable to provide in connection with systems of this invention adjustable exploring antennae to detect obstructions ahead of the aircraft, and to detect other aircraft in the vicinity. From the principles of the invention as above explained it is obvious that the adjustment contemplated is merely that of tilting the planes of transmission and reception together by a like amount with respect to the longitudinal axis of the fuselage, no lateral adjustment of either antennae pair being necessary or desirable. By the method of alternate interchange by suitable switching arrangements of transmitting and receiving antenna pairs, as above suggested, for determining the inclination of the aircraft with respect to the landing field, an indication of the approximate angle of a second aircraft or other obstruction not directly in front of the craft employing this system can be obtained.

It is to be understood, of course, that the arrangements shown in the drawings and described hereinbefore are purely diagrammatic and illustrative of the principles involved and that systems of this invention are capable of embodiment in different forms including systems employing energy waves other than electromagnetic waves without departing from the spirit of the invention and the scope of the appended claims.

What is claimed is:

1. A method of determining the distance between two parallel surfaces including transmitting from a point near one extremity of the first of said surfaces an ultra-short wave modulated by approximately 30 per cent with a longer wave, receiving at a plurality of fixed points, said points being at different distances from said transmitting point respectively and said receiving points being near an opposite extremity of said first surface, a like plurality of components of said modulated ultra-short wave after reflection from said second surface, employing the relative phase of said ultra-short wave components to determine distances less than three times the distance separating the transmitting and receiving points, and employing the phase of the longer modulating wave constituent of one of said reflected components relative to the phase of energy from the local source of the longer wave modulating frequency to determine greater distances whereby indications over an extended range of distances may be obtained.

2. The method of determining the altitude of an aircraft comprising transmitting from said craft an ultra-short wave modulated by approximately 30 per cent with a longer wave, receiving a portion of said wave on said craft after reflection from the earth, demodulating said received portion to obtain the long wave component, and comparing the phase of said long wave component with the phase of energy derived directly from the source of modulating energy on said craft to obtain an indication of the altitude of the aircraft.

3. The method of determining the distance between an object and a surface including transmitting from said object an ultra-short wave modulated by approximately 30 per cent with a longer wave, receiving on said object a portion of said wave after reflection from said surface, demodulating said received portion to obtain the longer wave component, and comparing the phase of said component with the phase of energy derived directly from the local source of modulating energy to obtain an indication of the said distance.

4. The method of determining the distance between a reflecting surface and an object over a range of distances comprising transmitting from a point on said object a wave of length suitable for use in distance determinations over a part of said range, said wave being modulated by approximately 30 per cent with a wave of different length suitable for distance determinations over the remaining part of said range receiving at two other points on said object two portions of said transmitted wave reflected from said surface, comparing the phases of the received portions of the carrier wave to determine the direction at which said portions appproach said receiving points and to obtain therefrom distance indications over a part of said range and demodulating one of said received portions to obtain the modulating component and comparing the phase of this component with the phase of energy derived directly from the local source of said modulating wave energy to obtain distance indications over the remaining part of said range whereby acceptable accuracy in distance determinations may be achieved over the entire said range.

5. The method of determining the distance between a reflecting surface and an object over an extended range of distances, comprising transmitting from a point on said object a wave of length suitable for use in distance determinations over a part of said extended range, said wave being modulated by approximately 30 per cent with each of a plurality of waves of different lengths, said plurality of waves being suitable for distance determinations over a like plurality of adjacent portions of the remaining part of said extended range receiving at two other points on said object portions of said transmitted wave reflected from said surface, comparing the phases of the received portions of the carrier wave to determine the direction at which said portions approach said receiving points and to obtain therefrom distance indications over a part of said range and demodulating one of said received portions to obtain the plurality of modulating components and comparing the phase of each modulating component with the phase of energy of like frequency derived from the local source of said frequency to obtain distance indications over a like plurality of adjacent portions of the remaining part of said extended range whereby increased accuracy in distance determinations may be achieved over the said extended range.

6. A radio altimeter system for aircraft comprising transmitting means to effect the emission of ultra-short waves from a point near one extremity of said aircraft over a wide range of angular directions toward the earth, a plurality of fixed receiving means, at different distances, respectively, from said point of emission, to receive near a second extremity of said aircraft components of said ultra-short waves reflected from the earth, and means for comparing the phases of said received reflected components to obtain the altitude.

7. A radio altimeter system for aircraft including transmitting means to emit ultra-short waves from a point near one extremity of said aircraft over a wide range of angular directions toward the earth, means for modulating said ultra-short waves by approximately 30 per cent with longer waves, a plurality of definitely spaced receiving means, each of said receiving means being at a different distance from said emitting point, to receive near a second extremity of said aircraft components of said ultra-short waves reflected from the earth, means for comparing the phases of said reflected components to obtain indications of the altitude which are accurate within one particular range of altitudes, and means for separating the longer wave modulating constituent of one of said reflected components and comparing its phase with the phase of energy derived directly from said modulating means to obtain simultaneously indications of the altitude which are accurate within another particular range of altitudes.

8. An altimeter for mobile craft including means for transmitting from said craft an ultra-short wave modulated by approximately 30 per cent with a longer wave, means for receiving on said craft a plurality of reflections of said wave at different distances respectively from the point of transmission of said wave and means for obtaining altitude indications from the reflected components of said ultra-short wave and from the modulating component thereof.

9. An aircraft altimeter including means for transmitting from said craft an ultra-short wave, means for modulating said ultra-short wave by approximately 30 per cent with a plurality of longer waves, means for receiving a portion of said wave after reflection from the earth, means for demodulating said received portion of said wave to obtain the longer wave modulating components and means for severally comparing the phases of said longer wave components with the phases of energy of like frequencies derived directly from the local modulating means to obtain a like plurality of indications of the altitude of said craft.

10. In a direction and distance determining system, the combination of a pair of antennae spaced a known distance from each other in a common plane, an electromagnetic shield extending sufficiently to substantially prevent reception by either of said antennae of electromagnetic waves approaching one side of the common plane of said antennae and means for comparing the two components of an electromagnetic wave impinging upon said antennae whereby ambiguity in directional indications obtained from said comparison is eliminated.

11. The method of determining the distance between an object and a reflecting surface comprising transmitting an energy wave from a first point on said object, receiving components of said wave after reflection from said surface at a second point and at a third point on said object, said second and third points being spaced at least 30 per cent of the maximum distance to be measured from said first point and approximately 3 per cent of said maximum distance from each other, and comparing the phases of the received components of said wave to determine said distance.

12. The method of determining the distance between an object and a reflecting surface comprising transmitting an energy wave from a point on said object toward said surface, receiving on said object a first component of said wave after reflection from said surface at a distance along said object from said transmitting point exceeding 30 per cent of the distance to be determined, receiving on said object a second component of said wave after reflection from said surface at a distance along said object from said transmitting point exceeding that at which said first component is received and comparing the phase of said two received components to determine the distance from said object to said surface.

13. The method of determining the altitude of an aircraft above the surface of the earth comprising transmitting an energy wave from a point on said aircraft toward the surface of the earth, receiving on said aircraft a first component of said wave after reflection from the earth at a horizontal distance along said aircraft from said transmitting point exceeding 30 per cent of the altitude to be determined, receiving on said aircraft a second component of said wave after reflection from the earth at a horizontal distance along said aircraft from said transmitting point exceeding that at which said first component is received and comparing the phase of said two received components to determine the altitude of said aircraft.

14. A system for determining the distance of an object from a surface comprising means for transmitting an energy wave from a point on said object, means for receiving on said object two components of said wave, after reflection from said surface, at two points respectively, one of said receiving points being further from said transmitting point than the other and means for comparing the phases of said two received components.

15. An altimeter for mobile craft including means for transmitting from said craft an ultra-short wave modulated by a longer wave, means for receiving on said craft a plurality of reflections of said wave at different distances respectively from the point of transmission of said wave, and means for obtaining altitude indications from the reflected components of said ultra-short wave and from the modulating components thereof.

16. An aircraft altimeter including means for transmitting from said craft an ultra-short wave, means for modulating said ultra-short wave by a plurality of longer waves, means for receiving a portion of said ultra-short wave after reflection from the earth, means for demodulating said received portion of said ultra-short wave to obtain the longer wave modulating components, and means for severally comparing the phases of said longer wave components with the phases of energy of like frequencies derived directly from the local modulating means to obtain a like plurality of indications of the altitude of said craft.

RAYMOND A. HEISING.